United States Patent
Ho

(10) Patent No.: US 7,536,000 B2
(45) Date of Patent: May 19, 2009

(54) COMMUNICATION METHOD FOR REAL-TIME CALLER INFORMATION BROADCASTING BY INTEGRATING NETWORK WITH TELEPHONE SWITCH

(76) Inventor: Tien-Hwa Ho, P.O. Box No. 6-57, Junghe, Taipei 235 (TW)

( * ) Notice: Subject to any disclaimer, the term of this patent is extended or adjusted under 35 U.S.C. 154(b) by 946 days.

(21) Appl. No.: 11/000,968

(22) Filed: Dec. 2, 2004

(65) Prior Publication Data
US 2005/0220283 A1  Oct. 6, 2005

(30) Foreign Application Priority Data
Mar. 30, 2004  (TW) .............................. 93108587 A

(51) Int. Cl.
*H04M 1/56* (2006.01)
*H04M 15/06* (2006.01)

(52) U.S. Cl. ............................ 379/142.15; 379/142.01; 379/142.06; 379/142.07; 370/352; 370/357

(58) Field of Classification Search ................ 379/88.2, 379/88.21, 93.17, 93.23, 142.01, 142.04, 379/142.06, 142.07, 142.15, 142.17, 245, 379/247; 670/356–359; 370/356–359
See application file for complete search history.

(56) References Cited

U.S. PATENT DOCUMENTS

2003/0228007 A1* 12/2003 Kurosaki ............... 379/142.06

* cited by examiner

*Primary Examiner*—Binh K Tieu

(57) ABSTRACT

The present invention relates to a communication method integrating network and extension forwarding to automatically broadcast caller messages to specific computer IP addresses, which will transmit in real-time the caller messages to a computer specified by each extension user, and display all kinds of information in a multimedia form, via network. The present invention comprises a main server, a caller ID module, a DTMF (Dual Tone Multi-Frequency) module, a telephone extension data base, a caller information database, a network communication interface, and a client-side program. When a user dials into an enterprise switch, the extension number that the caller intends to forward, and the caller's phone number will be retrieved, and be automatically transmitted to a computer specified by the extension user, thereby facilitating the retrieval of caller information for the extension user.

16 Claims, 5 Drawing Sheets

COMMUNICATION METHOD FOR REAL-TIME CALLER INFORMATION BROADCASTING BY INTEGRATING NETWORK WITH TELEPHONE SWITCH

BACKGROUND OF THE INVENTION a) Field of the Invention

The present invention relates to a caller ID system, and more particularly to a caller ID system wherein an enterprise which uses a conventional telephone switch can apply a network transmission technique, with its own computers and network, to construct a multimedia caller ID system that can correctly send caller information to a computer corresponding to the dialed extension, without changing the internal structure of original switch or switchboard.

b) Description of the Prior Art

For the related techniques and methods used for improving a conventional switch to a caller ID system, the internal structure of software and hardware of the switch should be changed, along with the replacement of the hardware of original telephone extension, such as the installation of a telephone card with caller ID at a trunk-line side and a house-line side. Moreover, the caller ID cannot be transmitted to an extension phone without the modification of internal software programs of the switch. On the other hand, all the extension devices intending to display the caller ID should be replaced with telephones with displaying screen. Therefore, it incurs higher cost, and is usually hard to accept for an enterprise with a conventional telephone switch. Telecommunication systems that simply use network to send news briefs or other multimedia messages cannot be combined with the function of extension forwarding. Other fax servers that use the function of extension forwarding to categorize faxing documents cannot send caller information to a specified network client-side program at that extension.

Patents regarding prior art telephone switch of caller ID techniques are listed below:

(1) Taiwan Patent No. 049470 (Mar. 16, 1983)
(2) Taiwan Patent No. 059276 (Jun. 16, 1984)
(3) Taiwan Patent No. 374277 (Nov. 11, 1999)
(4) Taiwan Patent No. 384595 (Mar. 11, 2000)
(5) Taiwan Patent No. 411689 (Nov. 11, 2000)
(6) Taiwan Patent No. 474089 (Jan. 21, 2002)
(7) Taiwan Patent No. 544590 (Aug. 1, 2003)
(8) Taiwan Patent No. 548944 (Aug. 21, 2003)
(9) Taiwan Patent No. 548945 (Aug. 21, 2003)

SUMMARY OF THE INVENTION

Many applications arise from the release of caller ID function by telecommunication industry. As caller information such as telephone number can be available when a phone is ringing, many practical applications will be created, especially in the operation of current enterprise commercial business, a small in-house PBX (Private Branch Exchange) and each telephone extension are still very important tools for communication and production. Having the capability of displaying caller information on an extension phone do facilitates the increase of a lot of production for the enterprise.

However, function of displaying caller information is seldom provided in a conventional telephone switch of enterprise. The reason lies in that the cost of replacement is very expensive; the entire switch system needs to be replaced, and each extension phone should be changed into a telephone with displaying screen. Up to now, a switchboard system of most enterprises is still not as popular as cellular phones or home telephones with the function of displaying caller information. Therefore, it will be very inconvenient to the operation of commercial business. For example, after a call from a client, as marketing personnel in an enterprise is not available or other causes, call back cannot be successfully performed due to the unavailability of the caller's phone number. Therefore, caller ID devices will be installed on extension phones. However, extension phones are located behind an enterprise switch, rather than directly connected with a trunk line, therefore, the function of displaying caller information is still not available.

Moreover, even a conventional enterprise do has a higher level switchboard system with the function of caller ID display, only numbers can be displayed on an extension phone, with just a line or two due to the small screen of an ordinary extension phone. Therefore, caller information that can be recorded is limited, and other caller information cannot be available when a line is busy, not mentioning displaying caller information in a multimedia form. Accordingly, providing a method that can solve the aforementioned problems without changing the original structure of telephone switch becomes very important.

It is well known that as the popularity of computer equipments, almost every middle- and high-level employee in an enterprise has a personal computer to process ordinary business, and there is hardly without network connection in current office environment. Accordingly, the present invention users a multi-line caller ID module and a DTMF (Dual Tone Multi-Frequency) module to parallel retrieve caller's telephone number, before connecting PSTN (Public Switched Telephone Network) and entering PBX (Private Branch Exchange), and without affecting the operation of switchboard. In addition, when a caller dials in an extension number following the voice instruction of switchboard, the present invention can collect and combine a DTMF signal, parse out the extension number, and then send it to a connected main server for processing. By the connection of a main server with an enterprise's intranet, a user of the enterprise can connect with that main server via a web browser of a desktop computer, and download a client-side program. Through the setting of corresponding mapping between a computer IP (Internet Protocol) address of the extension user and extension number, this client-side program can start to receive information transmitted from the main server. Therefore, when an outside line dials in an enterprise switchboard, and starts to forward to an extension, the main server has practically received caller's phone number and the forwarded extension number. Under this structure, the switchboard can still forward voice circuit to an extension phone as usual, and in the meantime, the main server will send that message to a user-specified computer via network. The client-side program can use a pop-up window or other multimedia means to bring attention to a user, thereby displaying a caller's detailed information on the screen of an extension user, at almost the same time with the ringing of the extension phone.

An enterprise will mostly implement computer and network equipments, whereas most conventional switch does not have the function of caller ID display. By the structure and methods of the present invention, with very inexpensive cost, it is very easy to have caller ID display for every enterprise employee, and acquire many unexpected results through the interaction of the main server and a client-side computer, such as that:

1. the present invention can clearly display alphanumeric messages, images, and other important caller information, such as time, number of calls, etc, on a computer screen in a multimedia form;

2. a TTS (Text-To-Speech) way can be configured to speak out a caller's name, or display customized caller information in other multimedia music form;
3. a large quantity of caller information can be recorded, limited only by computer memory space. As the client-side program will be noticed as soon as an outside line dials in, messages for that extension from the dialing of other outside line users can still be recorded even in a busy line;
4. under the structure of the present invention, an enterprise can also open this service to internet users, in addition to local area network users. Therefore, an outside employee can connect back to the enterprise and send messages to a local computer, or query detailed information of each caller;
5. except for extra hardware of caller ID and DTMF modules, and a single-chip microprocessor, the rest of hardware include original computer hardware and network infrastructure of an enterprise, associated with a software module of the present invention. Even the main server can be a designated PC specified by the enterprise;
6. the present invention can successfully fulfill a database management function of public address book, which can integrate with resources of customer management of an enterprise to achieve the effect of knowledge sharing;
7. the present invention can use the design of message forwarding to forward messages received by switchboard service personnel to each extension.

Although having the characteristics of simple structure and low hardware cost, the present invention can fulfill multiple functions, and thus has the value of practical applicability. At the time when many countries release the function of caller ID display, the present invention can facilitate many enterprises that have installed conventional telephone switch, to quickly benefit from more extensive customer relation management, based on the function of caller ID display.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
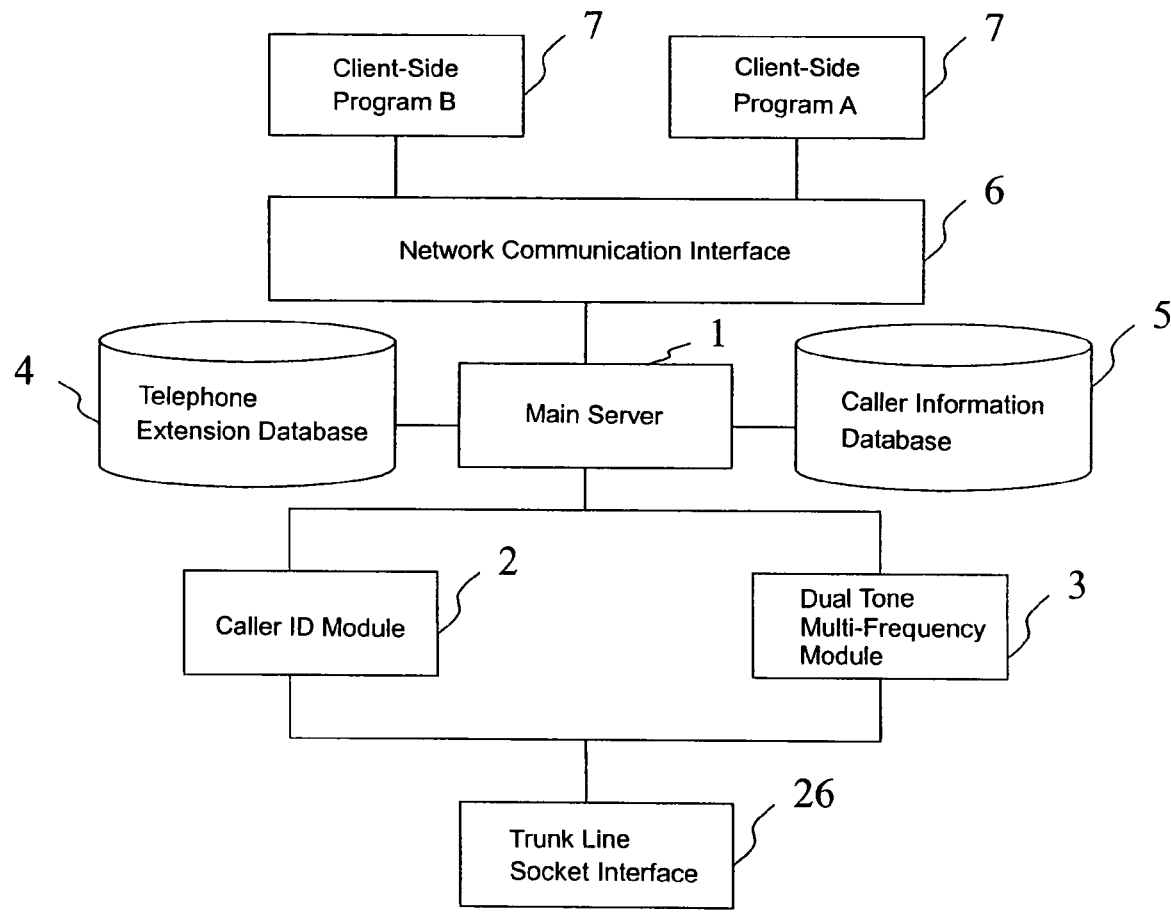
FIG. 1 shows a block diagram of devices and methods of the present invention.

Referring to FIG. 1, the present invention comprises a main server 1, a caller ID module 2, a DTMF (Dual Tone Multi-Frequency) module 3, a telephone extension database 4, a caller information database 5, a network communication interface 6, and a client-side program 7.

Accordingly; the present invention primarily establishes a mapping between a telephone extension number in a telephone switch, and a designated computer IP address, and stores in a telephone extension database 4, as well as stores a caller's phone number and related information in a caller information database 5. When a caller dials in a telephone switch system, other than that he or she can still normally press buttons to forward to each extension, the caller ID module 2 between the telephone switch and an outside line retrieves the caller's phone number, and hands over to the main server 1 to acquire other related information from the caller information database 5. In the meantime, via the DTMF module 3, the extension number from the caller can be acquired, and handing over to the main server 1 to find out the specified computer IP address corresponding to the extension number, from the telephone extension database 4. Thus, via the network communication interface 6, the main server 1 will automatically send the caller's phone number and related information to the client-side program 7 at the specified computer IP address.

Figure 2:
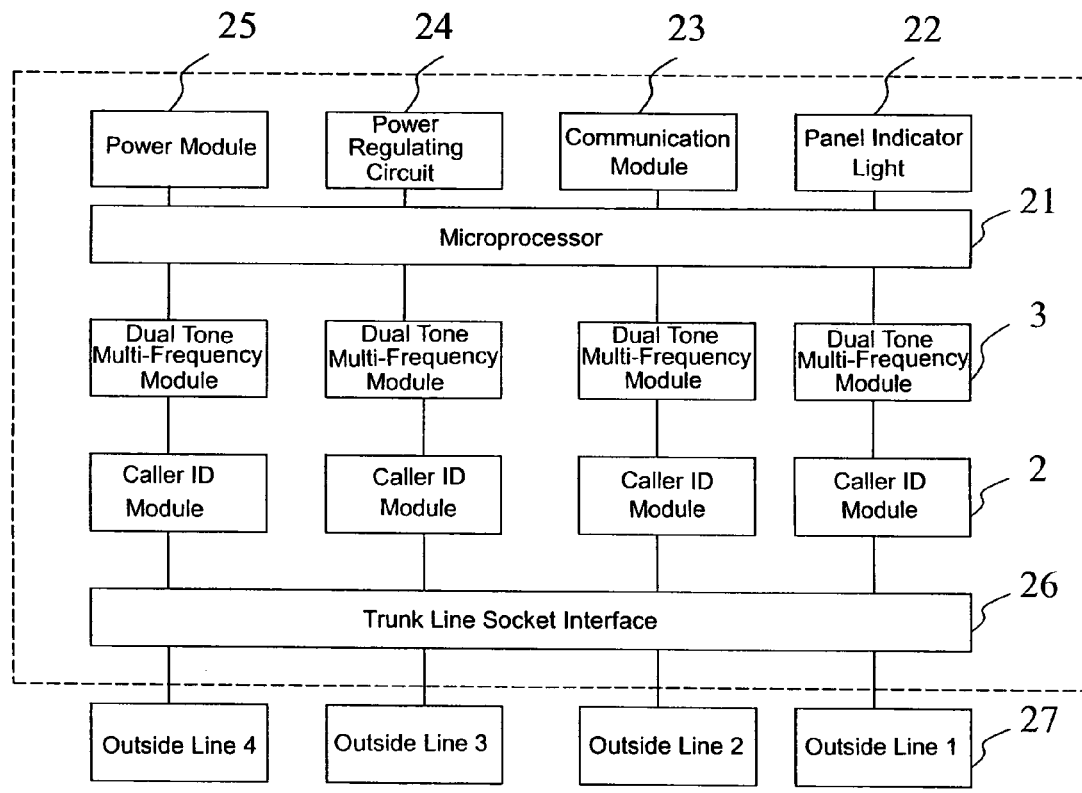
FIG. 2 shows a schematic view of a telephone interface module of the present invention.

Referring to FIG. 2, more than one combination of the caller ID module 2 and the DTMF module can be used to connect with an outside line at a trunk-line side through a trunk line socket interface 26, and then parallel connect with a trunk line input side in an enterprise. Therefore, every outside line can connect with a module, and a microprocessor 21 is responsible for communicating with the caller ID module 2 and the DTMF module 3 to retrieve a caller's phone number and send it to the main server 1, when receiving an incoming call. When a user presses buttons to input an extension number for forwarding, the microprocessor 21 is also responsible for collecting the correct extension number, and sending it to the main server 1. The microprocessor 21 uses a communication module 23 to send data to the main server 1, and a power module 25 and a power regulating circuit 24 are in charge of providing a regulated power. Should any abnormality occurs, a panel indicator light will emit various blinking messages. The entire circuit module can be combined into a telephone interface module 11. Through a setting of the main server 1, the DTMF module 21, which is in passive mode in ordinary condition, can instruct the microprocessor 21 to set the DTMF module to active mode, so that a simulated dial tone for forwarding each extension can be issued on a parallel telephone line, thereby achieving the effect of automatically forwarding to extension for a caller.

Accordingly, this structure is also applicable to a house line extension; the telephone interface module 11 can also be connected with each house line in a telephone switch. As a corresponding extension number to a module of each physical line can be configured, a caller's phone number and related information for that extension can be retrieved through database operation of the main server 1 when receiving a house call. In addition, when a user inputs voice signal, the microprocessor can use a voice recognition method to match against the caller information database 5, and find out that extension number. In the meantime, the main server 1 will transmit the extension number and related information to a specified computer IP address.

Figure 3:
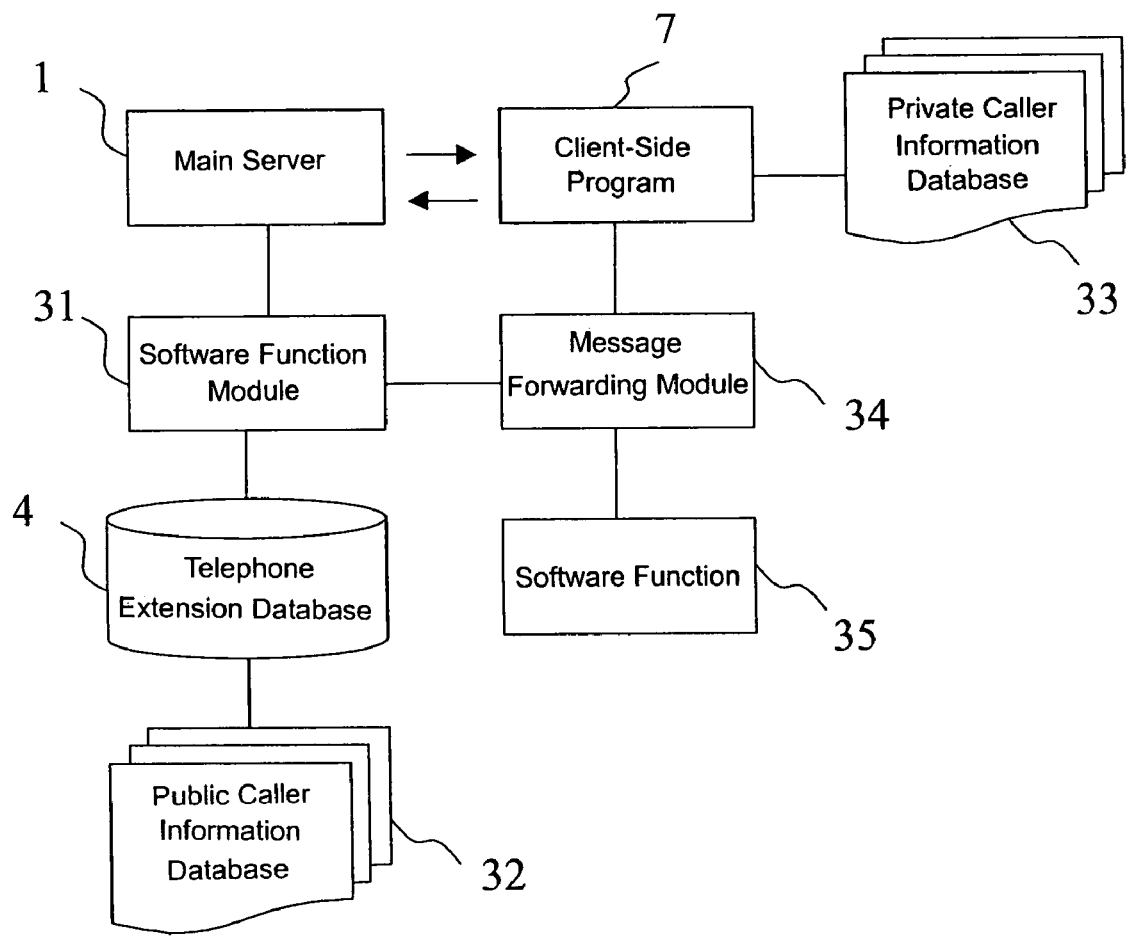
FIG. 3 shows a schematic view of software modules of a main server and a client-side program of the present invention.

Referring to FIG. 3, the main server 1 can communicate with the client-side program 7 via network. The software function module 31 is installed in the main server 1 to provide all kinds of function. The client-side program can also achieve all kinds of function through a software function module 35. Every extension user in an enterprise can download the client-side program 7, and use a pop-up window to display a caller's phone number and related information on a computer screen, via the software function module 35. Detailed text, voice, graph, motion picture, and video clip associated with a caller can be stored in the caller information database 5, whereas private caller information is stored in a private caller information database 33. However, caller information allowed for sharing among public is stored in a public caller information database 33. Therefore, the main server 1 can provide the public caller information to other extension users without this information, thereby achieving the object of knowledge management for sharing customer information in the enterprise.

When a user presses a forward button, the client-side program 7 can use a message forwarding module 34 to forward the caller's phone number and related information to other client-side programs, through the main server 1 or by direct connection. Therefore, switchboard personnel can successfully forward the caller information on a computer screen, and quickly transmit to an extension user who needs this information. Moreover, if the client-side program 7 specified by an extension user is at shutdown or crash state, causing the main server 1 cannot successfully transmit the extension number and related information, the main server 1 will temporarily store that extension number and related information, so that when the client-side program reboots or restores to normal state, the main server 1 can send the caller information to the client-side program 7 again. When an extension user's phone line is in busy state, if an incoming call at another outside line tries to forward to that extension, the main server 1 can still send the caller information to a specified computer IP address, thereby achieving the effect of call-waiting. In addition, upon receiving the caller information, the client-side program 7 can directly perform database functions in a screen of the client-side program 7, and select to store data in the private caller information database 33, or upload to the public caller information database 33, when a user presses a send button.

Figure 4:
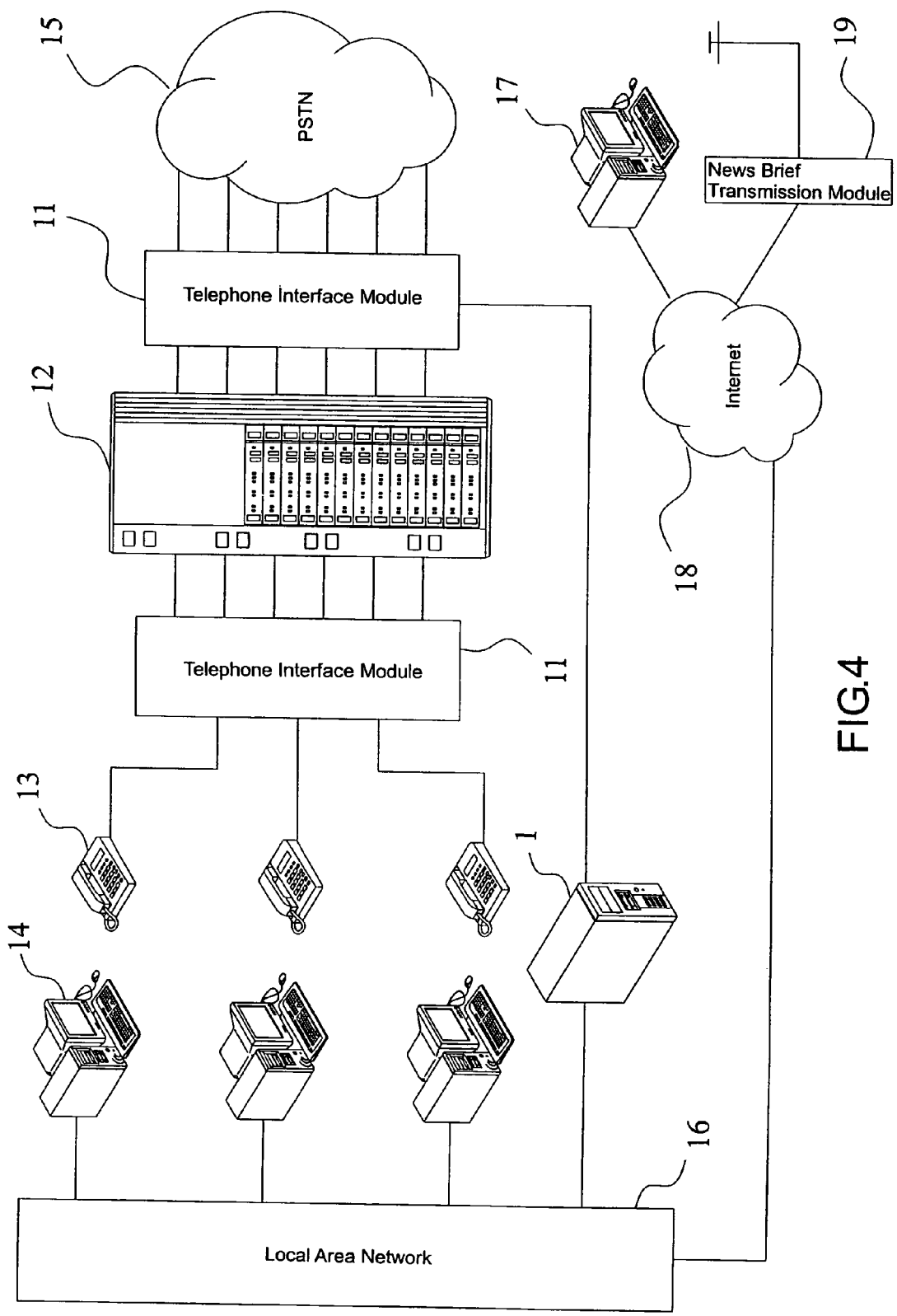
FIG. 4 shows a schematic view of an implementation of the present invention.

Referring to FIG. 4, through a PSTN (Public Switched Telephone Network) 15, a user can dial in a telephone switch of an enterprise, and allow it to forward to an extension (13), to perform conventional voice circuit exchange, wherein the telephone interface module 11 of the present invention is located between the PSTN 15 and the enterprise switchboard 12, so that the main server 1 can retrieve the caller information, and forward to a computer of each extension user, via a local area network 16. When a computer specified by an extension user is not in the local area network 16, using standard network protocols, and through internet 18, the present invention can also transmit all kinds of information to an external IP address of that specified computer. In addition, a user of client-side computer 14 can connect with the main server 1 with a web browser, to perform database setting and management, and to download the client-side program 7. Depending on user settings, the main server 1 can simultaneously send to more than one client computer 14, 17 the specific caller's phone number and related information, with a broadcasting method. Moreover, using a SMS (Short Message Service) protocol provided by telecommunication industry, the main server can transmit the caller's phone number and related information to a variety of communication systems, such as a news brief transmission module 19, through internet 18.

Figure 5:
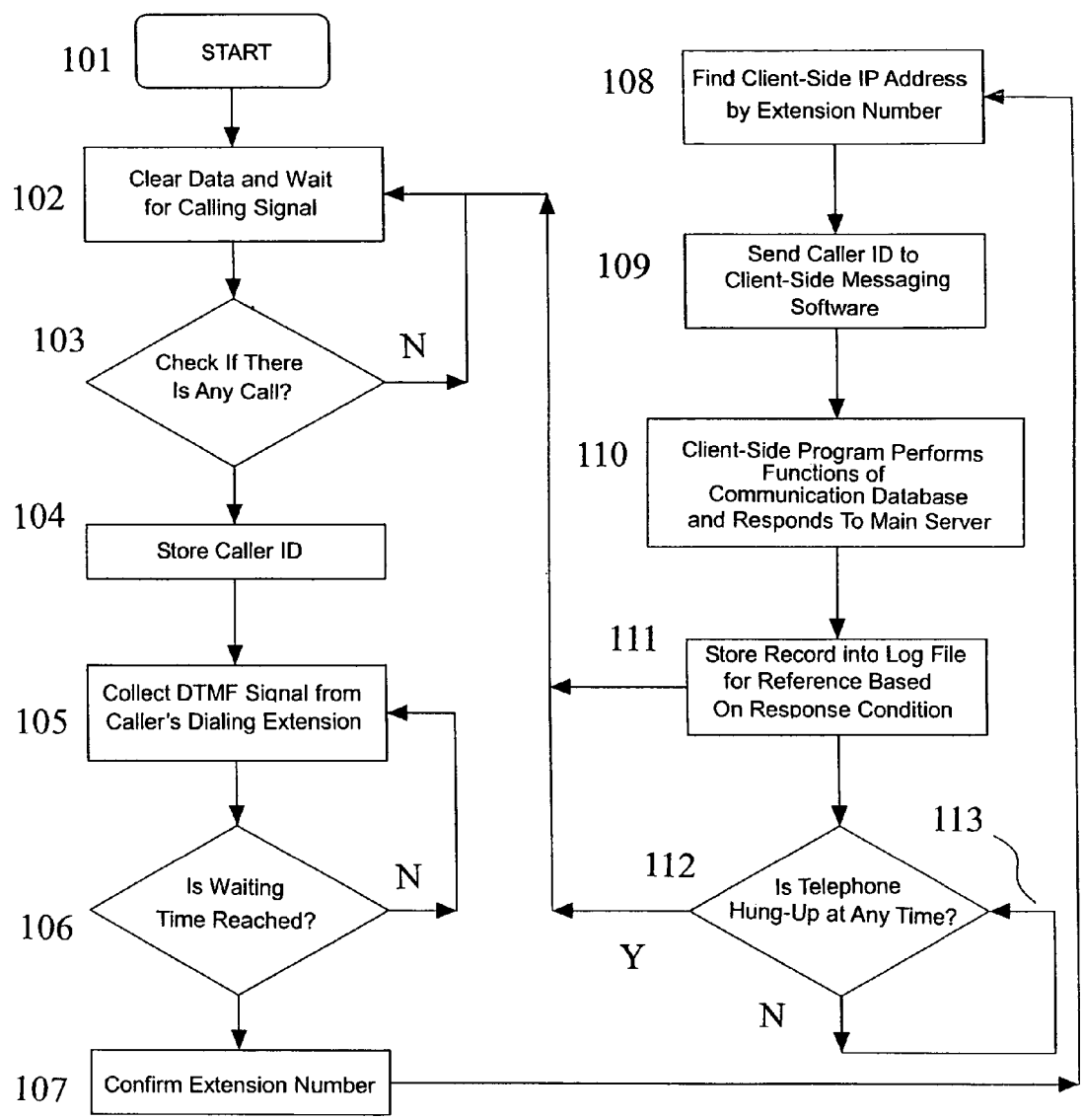
FIG. 5 shows a flow chart of part of operation of the present invention.

Referring to FIG. 5, it shows a flow diagram of part of operation of the present invention. After a caller ID system starts up 101, the telephone interface module 11 will clear data, and wait for caller's signal 102 at outside line of trunk. If block 103 determines that there is no call, the flow will go back to 102. If there is a call, a caller ID will be retrieved from the caller ID module 2, and stored 104. Next, the DTMF module 3 will collect any DTMF signal 105 from the pressing of a caller. After waiting for a while 106, which can be configured to be the same as the waiting time of an enterprise switch, the microprocessor 21 will treat the collected dialing number as the extension number that a caller needs to forward 107, and hand over to the main server 1, to find out the computer IP address at a client side 108, from the telephone extension database 4, and then transmit the caller information such as caller ID to a client side at that IP address 109. The client-side program 7 will perform all kinds of functions 110, in accordance with the software function module 35, and send back all kinds of response conditions to the main server 1. Finally, when both sides of the communication hang up, the flow will go back to 102, and wait 112.

In addition, if the extension number cannot be found in block 108, the system will not response at all, but just clear the original data from button pressing, and enter 105 to wait for new inputs from button pressing. During the period of two-way communication, any telephone button pressing, and all the button pressing in a reasonable time, will be treated as the action of re-forwarding to other extension by a caller. It is of course that during the period of any communication procedure, as long as the phone is hung up 113, the system will interrupt and abort the procedure, and directly go to 102 to wait for new incoming signal 112.

Although the cost of this communication device and method is very low, they do bring a lot of benefit to a user. Therefore, the present invention indeed is a new and practicably innovative creation.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A communication method automatically, correctly, and in real-time transmitting a caller information having caller's phone number to a specified computer for each extension user, without through an internal circuit of a conventional telephone switch (PBX), upon receiving an incoming call from a trunk line, including a main server, a caller ID module, a DTMF module, a telephone extension database, a caller information database, a network communication interface, and a client-side program; comprising steps of:

a) providing a user with a mapping between telephone extension number and a specified computer IP address, and storing in the telephone extension database, with a caller's phone number and related information stored in the caller information database;

b) when dialing into a telephone switch system, in addition to a user still forwarding to each extension in accordance with his or her button-pressing action, the caller's phone number retrieved via the caller ID module located between the telephone switch and outside line at trunk side, and also handing over to the main server for retrieving other related information associated with the user, from the caller information database;

c) retrieving the extension number input by the user with the DTMF module, and handing over to the main server for finding out the specified computer IP address corresponding to the extension number, thereby automatically and in real-time transmitting the caller's phone number and related information to the client-side program at the specified computer IP address by the main server, via the network communication interface.

2. The communication method according to claim 1, wherein more than one combination exists for the caller ID module and the DTMF module, which connects with each outside line of the switch, and a corresponding number based on a location of physical outside line of the switch is mapped to each module, to be incorporated into related caller information as a means of transmitting all kinds of data and querying.

3. The communication method according to claim 2, wherein the caller ID module and the DTMF module can be connected with each house line of an enterprise switch, to retrieve the caller's phone number and related information when receiving a house call.

4. The communication method according to claim 1, wherein the main server can use the DTMF module to issue a simulated dial tone for forwarding to an extension based on user settings, thereby achieving the effect automatically forwarding to extension for a caller.

5. The communication method according to claim 1, wherein even a computer specified by an extension user is not in the local area network, the present invention can also transmit caller information to the specified computer IP address via internet.

6. The communication method according to claim 1, wherein detailed text, voice, graph, motion picture, and video clip associated with a caller can be stored in the caller information database.

7. The communication method according to claim 1, wherein more than one client-side program and pop-up window can be applied to display a caller's phone number and related information on a computer screen.

8. The communication method according to claim 1, wherein the caller information database can store private caller information in a private caller information database, and store caller information allowed for sharing among public in a public caller information database, so that the main server can provide the public caller information to other extension users.

9. The communication method according to claim 1, wherein the client-side program can forward the caller's phone number and related information to other client-side programs, through the main server or by direct connection, if a user presses a forward button.

10. The communication method according to claim 1, wherein a user of the client-side program 4 can enter the main server with a web browser, to perform database setting and management, and to download the client-side program.

11. The communication method according to claim 1, wherein depending on user settings, the main server can simultaneously send to more than one client computer the specific caller's phone number and related information, with a broadcasting method.

12. The communication method according to claim 1, wherein if the client-side program specified by an extension user is at shutdown or crash state, causing the main server cannot successfully transmit the extension number and related information, the main server will temporarily store that extension number and related information, so that when the client-side program reboots or restores to normal state, the main server can send the caller information to the client-side program again.

13. The communication method according to claim 2, wherein if an extension user's phone line is in busy state, and an incoming call at another outside line tries to forward to that extension, the main server can still send the caller information to a specified computer IP address, thereby achieving the effect of call-waiting.

14. The communication method according to claim 1, wherein the main server can use a SMS (Short Message Service) protocol to transmit the caller's phone number and related information to a variety of communication systems, via computer network.

15. The communication method according to claim 1, wherein upon receiving the caller information, the client-side program can directly perform database functions in a screen of the client-side program, and upload to the all kinds of caller information database, when a user presses a send button.

16. The communication method according to claim 1, wherein a user can use a voice recognition method to match against the caller information database, and find out that extension number, at the same time that the main server transmits the extension number and related information to a specified computer IP address.

* * * * *